(12) United States Patent
Sugimoto et al.

(10) Patent No.: US 9,885,417 B2
(45) Date of Patent: Feb. 6, 2018

(54) PISTON RING

(75) Inventors: Kouhei Sugimoto, Niigata (JP);
Yoshinari Watanabe, Niigata (JP);
Toshikatsu Hayashi, Niigata (JP);
Ryou Obara, Tokyo (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/000,263

(22) PCT Filed: Feb. 17, 2012

(86) PCT No.: PCT/JP2012/053881
§ 371 (c)(1),
(2), (4) Date: Oct. 28, 2013

(87) PCT Pub. No.: WO2012/111826
PCT Pub. Date: Aug. 23, 2012

(65) Prior Publication Data
US 2014/0047974 A1    Feb. 20, 2014

(30) Foreign Application Priority Data
Feb. 18, 2011  (JP) .................................. 2011-033613

(51) Int. Cl.
*F16J 9/26* (2006.01)
*C23C 18/12* (2006.01)

(52) U.S. Cl.
CPC .............. *F16J 9/26* (2013.01); *C23C 18/122* (2013.01); *C23C 18/127* (2013.01); *C23C 18/1212* (2013.01); *C23C 18/1241* (2013.01)

(58) Field of Classification Search
USPC ................................ 428/34.1, 35.7; 277/442
See application file for complete search history.

(56) References Cited

U.S. PATENT DOCUMENTS 5,595,945 A * 1/1997 Wicks ............................. 501/12
5,914,151 A   6/1999 Usuki
6,641,893 B1  11/2003 Suresh et al.
(Continued)

FOREIGN PATENT DOCUMENTS

JP  62-233458 A  10/1987
JP  63-170546 A   7/1988
(Continued)

OTHER PUBLICATIONS

International Search Report for PCT/JP2012/053881 dated Apr. 3, 2012.
(Continued)

*Primary Examiner* — Ellen S Wood
(74) *Attorney, Agent, or Firm* — Kenealy Vaidya LLP

(57) ABSTRACT

Provided is a piston ring capable of maintaining an excellent effect of preventing aluminum cohesion in a high output engine over a long period of time. At least one of the upper, lower, and side faces of the piston ring is coated with a silica-based coating in which hard nanoparticles are dispersed. The coating has a Martens hardness of 1,000 to 8,000 N/mm$^2$. As the hard nanoparticles, carbon nanoparticles, nanodiamond particles, carbon nanotubes, or carbon nanofibers are used. To the coating, resin particles of a fluorine-based resin or a polyether-based resin may be added.

4 Claims, 3 Drawing Sheets

(56) References Cited

U.S. PATENT DOCUMENTS

| | | |
|---|---|---|
| 2005/0269787 A1 | 12/2005 | Muramatsu et al. |
| 2005/0279478 A1 | 12/2005 | Draper et al. |
| 2007/0004598 A1 | 1/2007 | Maeda |
| 2008/0145649 A1* | 6/2008 | Mannem ............. C10M 111/00 428/336 |
| 2008/0235960 A1 | 10/2008 | Eskelinen |
| 2009/0058014 A1 | 3/2009 | Kariya et al. |
| 2010/0140880 A1* | 6/2010 | Hayashi et al. ............. 277/442 |
| 2010/0183993 A1 | 7/2010 | McAlister |
| 2012/0101011 A1* | 4/2012 | Makino et al. ............... 508/100 |

FOREIGN PATENT DOCUMENTS

| | | |
|---|---|---|
| JP | 9-71409 A | 3/1997 |
| JP | 2004-68815 A | 3/2004 |
| JP | 2006-258110 A | 9/2006 |
| JP | 4151379 B2 | 9/2008 |
| WO | 2007/099968 A1 | 9/2007 |
| WO | 2008/062863 A1 | 5/2008 |

OTHER PUBLICATIONS

Japanese Office Action for the related Japanese Patent Application No. 2012-558047 dated Jul. 2, 2013.
Japanese Notice of Allowance for the related Japanese Patent Application No. 2012-558047 dated Nov. 26, 2013.
Amendment for the related Japanese Patent Application No. 2012-558047 dated Aug. 27, 2013.
Argument for the related Japanese Patent Application No. 2012-558047 dated Aug. 27, 2013.
The extended European Search Report for the related European Patent Application No. 12747671.1 dated Mar. 19, 2015.

* cited by examiner

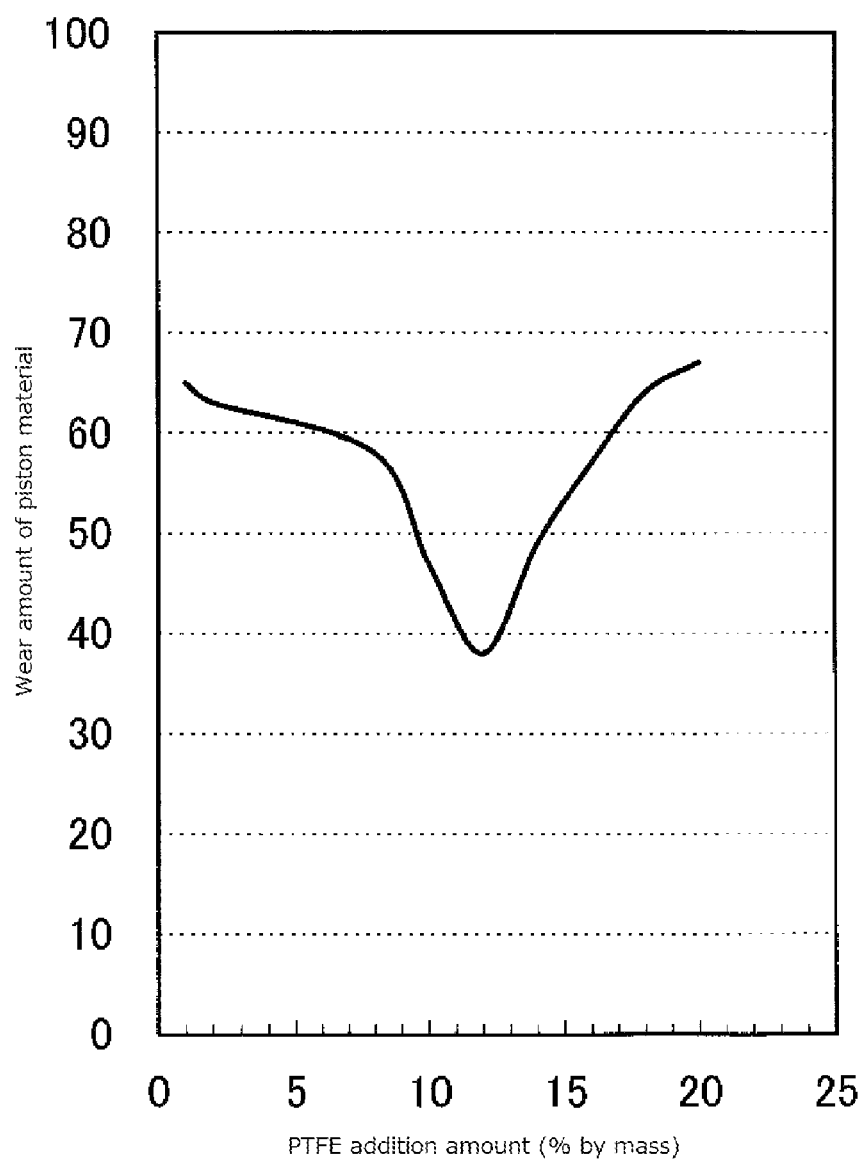

PISTON RING

This application is a U.S. national phase filing under 35 U.S.C. § 371 of PCT Application No. PCT/JP2012/053881, filed Feb. 17, 2012, and claims priority under 35 U.S.C. § 119 to Japanese patent application no. 2011-033613, filed Feb. 18, 2011, the entireties of both of which are incorporated by reference herein.

TECHNICAL FIELD

The present invention relates to a piston ring, and more particularly to a piston ring for an internal combustion engine.

BACKGROUND ART

The temperature around a top ring of a gasoline engine reaches a high temperature of 200° C. or higher by combustion of fuel. In an internal combustion engine, a piston ring and a surface of a piston ring groove of a piston (hereinafter referred to as "ring groove surface") repeatedly collide by combustion pressure at such a high temperature. At the same time, the piston ring surface and the ring groove surface slide in a circumferential direction.

The ring groove surface has projections that have been produced in lathe turning using a cutting tool and have a height of approximately 1 μm at intervals of 0.2 mm. As a material for a piston, an aluminum alloy is generally used for weight saving of an automobile body. However, an aluminum-based material has a low heat resistance, and when the temperature is higher than 200° C., the hardness thereof is reduced. The ring groove surface collides with a piston ring at such a high temperature and slides to cause a fatigue fracture of the ring groove surface. Thus, the projections come off the surface, and an active fresh surface made of an aluminum alloy appears on the ring groove surface. Dropped aluminum alloy pieces and the fresh surface of aluminum alloy appeared in the ring groove collide with the piston ring to be brought into contact with the upper and lower faces of the piston ring and thus slide. The aluminum alloy pieces cohere to the side face of the piston ring, or "aluminum cohesion" in which the piston ring body adheres to the fresh surface of aluminum alloy of the piston occurs. The aluminum cohesion continuously occurs so long as the fresh surface of aluminum alloy continues to be generated. The aluminum cohesion proceeds, and the piston ring adheres to the piston in the ring groove. As a result, the sealing performance of the piston ring is impaired. A gas sealing function as one sealing performance is impaired to cause a blowby phenomenon in which high-pressure combustion gas flows from a combustion chamber to a crank chamber. As a result, the engine output is decreased. Further, when an oil sealing function is impaired, the consumption of oil is increased. In addition, the aluminum cohesion promotes wear of the ring groove, and the sealability between the upper and lower faces of the piston ring and the ring groove surface is impaired to increase the amount of blowby.

As a method for preventing aluminum cohesion, many methods including a method in which an aluminum alloy that is a piston base material is not brought into direct contact with a piston ring, and particularly a top ring, and a method for alleviating an attack on a ring groove by a piston ring, have been conventionally proposed.

As the countermeasures of a piston, Patent Literature 1 describes a method in which a ring groove surface is subjected to an anodic oxidation treatment (anodized aluminum treatment), and micropores formed by the treatment are charged with a lubricating substance. Since a hard coating containing aluminum oxide as a main component is formed on the ring groove surface by the anodized aluminum treatment, the aluminum alloy that is a piston base material is prevented from separating, and cohesion to a piston ring is suppressed. However, there are problems in which the cost for the anodic oxidation treatment on a piston is high and aluminum oxide has poor initial running-in properties due to hardness.

On the other hand, as the countermeasures of a piston ring, Patent Literature 2 describes a method for forming, on the side face of the piston ring, a coating in which molybdenum disulfide as a solid lubricant is dispersed in polyamide or polyimide as a heat resistant resin. According to the configuration in Patent Literature 2, the solid lubricant in the coating is cleaved and worn, and accordingly the friction coefficient of the coating is decreased. Thus, the attacking properties on a ring groove are alleviated, and aluminum cohesion is suppressed.

Further, Patent Literature 3 describes a method for forming a surface coating which includes a heat resistant resin containing a copper powder on the side face of a piston ring. In Patent Literature 3, the wear resistance is imparted to the surface coating formed on the surface of the piston ring by addition of the copper powder, and accordingly the lubricity due to the heat resistant resin can be exerted over a long period of time.

Moreover, Patent Literature 4 shows that a dry coating lubricant containing a polyamideimide resin as a main component, a coating modifier for a polyamideimide resin, and hard particles of alumina or the like is formed on a sliding face of a sliding member having a streak with a predetermined surface roughness, thus the friction coefficient can be decreased while the wear resistance and adhesive property of the sliding member can be improved. Further, Patent Literature 4 describes that from the viewpoint of balance of wear resistance and wear of an opposite material, it is preferable that the hard particles be alumina and silicon nitride having a predetermined hardness.

Recently, in order to cope with the improvement of fuel efficiency, an increase in combustion pressure of an engine proceeds. As a result, the attainment temperature around a top ring is higher. In such a situation, a fatigue fracture due to a decrease in the piston strength tends to occur, and it is difficult to maintain a coating that covers a piston ring and is made of a resin over a long period of time. In Patent document 2, the solid lubricant is added as an essential component. However, the solid lubricant itself is cleaved and worn as described above, and therefore the friction coefficient of the coating is decreased. Thus, the attacking properties on a ring groove are alleviated. Therefore, the wear resistance of the coating is low, and it is difficult to maintain the coating over a long period of time and to keep the effect of preventing aluminum cohesion. The wear of the coating is attempted to be suppressed, but the amount of the solid lubricant to be added is limited, and a decrease in the friction coefficient of the coating is also limited. For this reason, the surface of the piston material having a lowered hardness at a high temperature may be roughened. Further, aluminum cohesion may occur. Since the coatings in Patent Literatures 3 and 4 are each a resin coating, the wear resistance is limited. At a high temperature, the coating may be lost due to wear or thermal decomposition, and it is difficult to maintain the effect of preventing aluminum cohesion over a long period of time.

Therefore, at present time, a piston ring that can maintain a high effect of preventing aluminum cohesion in a high output engine over a long period of time has not been achieved.

PRIOR ART LITERATURES

Patent Literatures

Patent Literature 1: Japanese Patent Application Laid-Open No. Sho. 63-170546
Patent Literature 2: Japanese Patent Application Laid-Open No. Sho. 62-233458
Patent Literature 3: WO 2007/099968
Patent document 4: Japanese Patent No. 4151379

DISCLOSURE OF THE INVENTION

Problems to be Solved by the Invention

Accordingly, an object of the present invention is to solve the above-described problems and provide a piston ring capable of maintaining an excellent effect of preventing aluminum cohesion in a high output engine over a long period of time.

Means for Solving the Problems

In view of the foregoing object, the present inventors have conducted extensive studies, and as a result found that when a silica-based coating containing hard nanoparticles is formed on at least one of the upper, lower, and side faces of a piston ring, an excellent effect of preventing aluminum cohesion can be maintained in a high output engine over a long period of time. Therefore, the inventors have arrived at the present invention. Therefore, the piston ring of the present invention is characterized in that a silica-based coating containing hard nanoparticles is formed on at least one of the upper, lower, and side faces.

Effects of the Invention

The coating of the present invention in which hard nanoparticles are dispersed in a silica-based coating has a high hardness, a low friction coefficient, and low attacking properties on an opposite material. For this reason, the surface of a piston made of an aluminum alloy as an opposite material can be smoothened for a short time without roughening. Further, the occurrence of aluminum cohesion can be effectively prevented. Since the coating of the present invention has a matrix (base) of silica having excellent heat resistance, the coating cannot be thermally decomposed even at a high temperature. Since hard nanoparticles are dispersed in silica having a high hardness, the coating has excellent wear resistance and is maintained over a long period of time. Further, the effect of preventing aluminum cohesion is maintained.

BRIEF DESCRIPTION OF THE DRAWINGS

FIG. 3 is a graph showing the relationship between the amount of PTFE particles to be added and the wear amount of a piston material.

MODE FOR CARRYING OUT THE INVENTION

Figure 1:
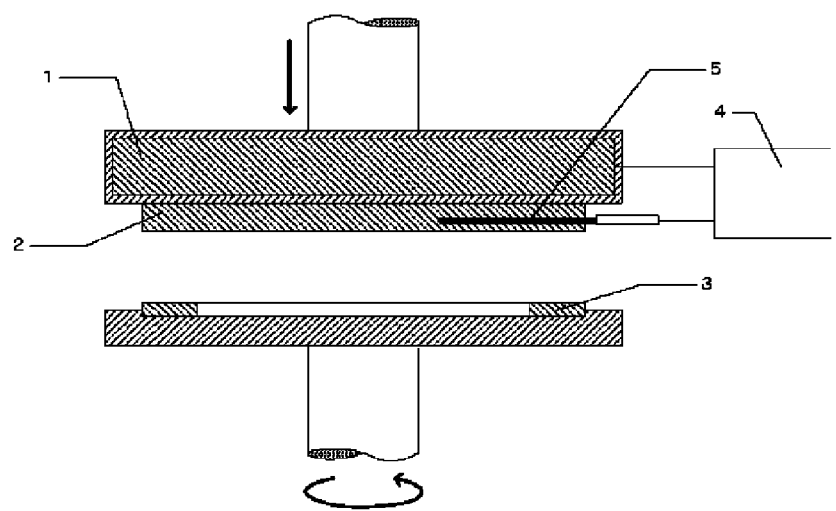
FIG. 1 is a cross-sectional view illustrating an overview of a simple cohesion test machine.

Hereinafter, the piston ring of the present invention will be decreased in detail.
(1) Piston Ring Base Material
A base material for a piston ring of the present invention is not particularly limited, and desirably has a certain strength. This is because the piston ring repetitively collides with a ring groove. Examples of preferred materials may include steel, martensite stainless steel, austenite stainless steel, and high grade cast iron.
(2) Underlying Surface Treatment of Piston Ring
The underlying surface treatment of a piston ring base material is not particularly needed. Even when a piston ring base material that has been subjected to only a degreasing treatment after processing is used, a sufficient adhesive property can be achieved. A piston ring in which a hard chrome plating coating or an electroless nickel plating coating is formed on the surface of the base material may be used. In order to improve the adhesive property, the piston ring surface can be plasma-treated, or the surface of piston ring base material can be coated with an oxide film or a coupling agent.
(3) Coating
The coating covering the piston ring of the present invention contains silica as an inorganic binder and hard nanoparticles. When the hard nanoparticles are dispersed in silica, the friction coefficient is decreased. Thus, a coating having a low friction coefficient and a high hardness can be obtained. When a piston ring is covered with such a coating, the surface of a piston made of an aluminum alloy as an opposite material can be smoothened for a short time without roughening. Further, the occurrence of aluminum cohesion can be effectively prevented. Since hard nanoparticles are dispersed in silica having a high hardness, the coating has excellent wear resistance. Further, the coating has excellent heat resistance since silica is used as a binder. According to the piston ring of the present invention, the coating can be maintained even in a high output engine over a long period of time, and the excellent effect of preventing aluminum cohesion can be maintained.

When the coating of the present invention is formed on at least one of the upper, lower, and side faces of the piston ring, the effects of the present invention can be obtained. In particular, when the coating is formed on the lower and side faces, the excellent effect of preventing aluminum cohesion can be exerted. Further, when the coating is formed on the upper, lower, and side faces of the piston ring, the more excellent effect can be obtained.

The Martens hardness of the coating measured by the method described below is preferably 1,000 to 8,000 N/mm$^2$, and more preferably 3,000 to 7,000 N/mm$^2$. The coating having a Martens hardness within this range has excellent smoothening effect of a piston made of an aluminum alloy as an opposite material. The attacking property on the piston made of an aluminum alloy is suppressed, and therefore the excellent effect of preventing aluminum cohesion can be maintained over a longer period of time. The Martens hardness of the coating can be adjusted by a composition of raw materials for silica, a firing temperature, and an amount of hard nanoparticles to be added, as described below.

A method of synthesizing silica used in the present invention is not particularly limited. A liquid phase method is preferably used since the dispersion of the hard nanoparticles is facilitated and synthesis can be performed at a low temperature. Examples of the liquid phase method may include a sol-gel method and a method using polysilazane. The method using polysilazane is preferable since the thickness of the coating is easily increased and the temperature of conversion into silica is low. In the method using polysilazane, a solution of perhydropolysilazane in an organic solvent is used. Examples of the organic solvent may include aromatic hydrocarbon solvents such as benzene, toluene, and xylene. Among them, xylene is preferably used. Examples of commercially available products of the solution of perhydropolysilazane in an organic solvent may include AQUAMICA available from AZ electronic Materials.

The solution of perhydropolysilazane in an organic solvent is applied to the surface of a base, dried, and fired in air to be converted into silica glass ($SiO_2$). When the firing temperature is increased, the conversion into silica is promoted, and a coating having high density and hardness can be obtained. The coating covering the piston ring of the present invention may not be completely converted into silica, and may be a composition containing an NH group and an H group as residual groups. In this case, the Martens hardness of the coating is preferably 1,000 to 8,000 $N/mm^2$, and more preferably 3,000 to 7,000 $N/mm^2$. When the Martens hardness falls within the above-described range, an organic material such as an acrylic resin may be added, or an organic silazane in which an organic group is introduced into the polymer side chain of polysilazane may be used. According to such a configuration, the occurrence of a crack is suppressed and the thickness of the coating is easily increased.

When firing at a high temperature is difficult from the viewpoints of heat resistance and production cost of the piston ring base material, a solution of perhydropolysilazane in which a catalyst is added is preferably used. When a catalytic reaction is performed using this solution under a high humidity atmosphere to promote conversion into silica, the firing temperature can be decreased. Therefore, in the present invention, a coating having a desired Martens hardness can be formed by appropriately setting the composition of the perhydropolysilazane solution to be used, the firing conditions, and the like.

On the other hand, in the sol-gel method, water and a hydrolysis accelerator are added to an alcohol solution of tetraalkoxysilane to prepare a mixed solution, and the mixed solution is applied to the surface of a base, dried, and fired. Examples of tetraalkoxysilane may include tetramethoxysilane, tetraethoxysilane, tetra-n-propoxysilane, and tetraisopropoxysilane. Examples of alcohol may include methanol, ethanol, n-propanol, and isopropanol. Examples of the hydrolysis accelerator may include acids such as hydrochloric acid, sulfuric acid, nitric acid, hydrofluoric acid, acetic acid, and oxalic acid, and bases such as ammonia, sodium hydroxide, and alkylamine.

No particular limitation is imposed on the nanoparticles to be added to the coating covering the piston ring of the present invention. For example, inorganic nanoparticles such as alumina, silica, silicon carbide, silicon nitride, cubic boron nitride, zirconia, and titania, or hard carbon-based nanoparticles such as carbon nanoparticles, nanodiamond particles, carbon nanotube, and carbon nanofibers are used. Among them, nanodiamond particles and carbon nanoparticles are preferable since they have a solid lubrication effect to reduce the frictional resistance, and a low reactivity with aluminum to exert an excellent effect of preventing aluminum cohesion. Examples of commercially available products of nanodiamond particles may include SCM nanodiamond polycrystal type (primary particle: 5 to 20 nm) available from Sumiseki Materials Co., Ltd., uDiamond (primary particle: 4 to 6 nm) available from Carbodeon, and Cluster Diamond (CD) available from Tokyo Diamond Tools Mfg. Co., Ltd. Examples of commercially available products of carbon nanoparticles may include nanoporous carbon (primary particle diameter: 20 to 50 nm) available from Advanced Diamond Technologies, Inc. One kind of hard nanoparticle may be added, or two or more kinds thereof may be added. The average secondary particle diameter of the hard nanoparticles is preferably 10 to 600 nm, and more preferably 50 to 200 nm. When the average secondary particle diameter is less than 10 nm, the particle diameter is small, and the effect of smoothening a ring groove surface may not be sufficient. On the other hand, when the average secondary particle diameter exceeds 600 nm, the ring groove surface may be roughened.

It is preferable that the amount of hard nanoparticles to be added be adjusted to a range where the Martens hardness of the silica-based coating falls within the above-described range. Specifically, the amount is preferably 0.5% to 10%, and more preferably 1% to 5%, relative to the volume of the entire silica-based coating.

In addition to the hard nanoparticles, resin particles can be added to the coating covering the piston ring of the present invention. The coexistence of hard nanoparticles and resin particles can further reduce the friction coefficient of the coating, and decrease the wear amount of the piston material. By the addition of resin particles, stress is dispersed to relax the internal stress (to suppress stress concentration). Therefore, the occurrence of a crack is suppressed. Even when a crack occurs in the matrix portion of the coating, the propagation of the crack is suppressed by the resin particles. Further, the addition of the resin particles can enhance the toughness of the coating and improve the adhesive property with a base. Therefore, the coating cannot be separated over a long period of time and can be stably maintained, and the excellent effect of preventing aluminum cohesion can be maintained.

The resin particles to be added to the coating of the present invention are not particularly limited. Examples thereof may include an olefin-based resin, a polyether-based resin, a polyamide-based resin, a polyamideimide-based resin, a polyimide-based resin, a silicone-based resin, and a fluorine-based resin. Examples of the polyether-based resin may include polyetherether ketone (PEEK) and polyether ketone (PEK).

Examples of the polyamide-based resin may include aromatic polyamides such as polyhexamethylene isophthalamide (nylon 6I), polynonamethylene terephthalamide (nylon 9T), and PA46T, and polytetramethylene adipamide (PA46). Examples of the fluorine-based resin may include polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polychlorotrifluoroethylene (PCTFE), vinylidene fluoride (PVDF), and polyvinyl fluoride (PVF). Among them, a polyether-based resin and a fluorine-based resin are preferable, and PEEK and PTFE are particularly preferable, from the viewpoints of heat resistance and sliding property.

The contained amount of the resin particles of the present invention is preferably 8% by mass to 16% by mass, and more preferably 10% by mass to 14% by mass, relative to the mass of the entire coating assumed to be 100. When the amount of resin particles to be added falls within the above-described range, the friction coefficient of the coating is largely decreased, and the wear amount of an opposite material is further decreased. In addition, the coating is maintained over a long period of time, and the excellent effect of preventing aluminum cohesion can be maintained.

The average particle diameter of the resin particles is preferably 0.2 µm to 4.0 µm, and more preferably 0.2 µm to 1.5 µm.

The addition of the resin particles decreases the hardness of the entire coating. The Martens hardness of the matrix portion of the coating calculated by the method described below, that is, a portion where the resin particles are not present is preferably 1,000 to 8,000 N/mm$^2$, and more preferably 3,000 to 7,000 N/mm$^2$.

The thickness of the coating covering the piston ring of the present invention is preferably 0.5 to 20 µm, and more preferably 1 to 10 µm. When the thickness is less than 0.5 µm, the coating is worn before the surface of the ring groove is smoothened. Therefore, the effect of preventing aluminum cohesion may not be sufficiently exerted. When the thickness of the coating exceeds 20 µm, the attachment of a piston ring to a ring groove may be failed. This is not preferable from the viewpoint of cost.

(4) Method for Forming Coating

A method of forming a coating of the present invention is not particularly limited, and the known method such as spray coating, spin coating, roll coating, dip coating, and a printing method is used. The printing method is preferable since the application efficiency is excellent and the generation of uneven coating can be suppressed. From the viewpoint of simple way, spray coating is preferable.

A method of adjusting a coating liquid or an ink is not particularly limited, and the known method can be used. Specifically, hard nanoparticles and if necessary, a dispersant are added to the solution of perhydropolysilazane in an organic solvent or a mixed solution of tetraalkoxysilane, and the mixture is mixed and dispersed. In a dispersion method, a sand mill, a bead mill, a ball mill, a homogenizer, or a wet-type jet mill, which is known is used. A solvent and an additive that are used to adjust the viscosity of the coating liquid or ink are appropriately selected depending on the coating method or the printing method.

After application of the coating liquid or printing, drying and firing are performed. The firing is usually performed at 200° C. to 500° C.

EXAMPLES

Hereinafter, the present invention will be more specifically described by way of Examples, but the present invention is not limited to the Examples.

Example 1

Nanoporous carbon (available from Advanced Diamond Technologies, Inc., primary particle diameter: 20 to 50 nm) and a dispersant were added to a solution of 20% perhydropolysilazane in xylene (AQUAMICA available from AZ electronic Materials), and dispersed with an ultrasonic homogenizer. The dispersion state of nanoporous carbon was confirmed by the particle size distribution. The amount of nanoporous carbon to be added was calculated using 1.6 g/cm$^3$ as the density of silica, and was 3% by volume relative to the volume of the entire coating.

A piston ring made of oil tempered chromium silicon alloy steel wires for a valve spring (SWOSC-V) was subjected to alkaline degreasing, and then coated with the coating liquid by dip coating. The surface roughness Ra of a piston ring base material before the coating was 0.11 µm. The coating was dried at 100° C. for 10 minutes, and then fired at 300° C. for 1 hour in an electric furnace. The thickness of the obtained coating was 2 µm, the Martens hardness HM measured by the following method was 4,850 N/mm$^2$, and the surface roughness Ra (JIS B0601-'01) of the coating was 0.14 µm.

The Martens hardness HM of the coating was measured with an ultra micro hardness test machine (DUH-211 manufactured by Shimadzu Corporation). A 115° triangular pyramid indenter was pressed against the coating at a test load F of 9.8 mN, and an indentation depth h at this time was measured. The Martens hardness HM115 was calculated using the following arithmetic expression (ISO 14577-1 Annex A).

$$HM115 = 1000F/26.43\ h^2$$

Example 2

A coating was formed on the upper, lower, and side faces of a piston ring in the same manner as in Example 1 except that Cluster Diamond (CD available from Tokyo Diamond Tools Mfg. Co., Ltd.) was used as hard nanoparticles instead of nanoporous carbon. The thickness of the obtained coating was 2 µm, the Martens hardness HM was 5,030 N/mm$^2$, and the surface roughness Ra (JIS B0601-'01) of the coating was 0.08 µm.

Comparative Example 1

A molybdenum disulfide powder (average particle diameter: 2 µm) and a graphite powder (average particle diameter: 2 µm) were added to a liquid in which a polyamideimide (PAI) resin (HR16NN available from TOYOBO CO., LTD.) was diluted with N-methyl-2-pyrrolidone. The mixture was sufficiently stirred with a stirrer, and passed through a three-roll mill with the shortest distance between rolls to prepare a coating liquid. The amounts of the added molybdenum disulfide powder and graphite powder were each 5% by mass relative to the mass of the entire coating assumed to be 100. A coating was formed using the obtained coating liquid on the same piston ring used in Example 1 in the same manner as in Example 1. The thickness of the obtained coating was about 10 µm, and the Martens hardness HM was 250 N/mm$^2$.

Comparative Example 2

A scale-shaped copper powder having an average particle diameter of 10 µm was added to a liquid in which a polyamideimide resin (HR13NX available from TOYOBO CO., LTD.) was diluted with N-methyl-2-pyrrolidone. The mixture was sufficiently stirred with a stirrer, and passed through a three-roll mill with the shortest distance between rolls to prepare a coating liquid. The amount of the added copper powder was 20% by mass relative to the mass of the entire coating assumed to be 100. A coating was formed using the obtained coating liquid on the same piston ring used in Example 1 in the same manner as in Example 1. The thickness of the obtained coating was about 10 μm, and the Martens hardness HM was 270 N/mm².

Comparative Example 3

A piston ring made of oil tempered chromium silicon alloy steel wires for a valve spring (SWOSC-V) was subjected to alkaline degreasing. An amorphous hard carbon coating was formed on the surface of a base by an RF plasma CVD method. The thickness of the obtained amorphous hard carbon coating was 5 μm, the Martens hardness of the coating was 11,000 N/mm², and the surface roughness Ra (JIS B0601-'01) was 0.14 μm.

Comparative Example 4

A piston ring made of oil tempered chromium silicon alloy steel wires for a valve spring (SWOSC-V) was subjected to alkaline degreasing, and then coated with a solution of 20% perhydropolysilazane in xylene (AQUAMICA available from AZ electronic Materials) by dip coating, dried at 100° C. for 10 minutes, and then fired at 300° C. for 1 hour in an electric furnace. The thickness of the obtained coating was 2 μm, the Martens hardness HM was 4,250 N/mm², and the surface roughness Ra of the coating was 0.05 μm.

(Simple Cohesion Test)

Each piston ring 3 in each of Examples 1 and 2 and Comparative Examples 1 to 4 was attached to a simple cohesion test machine as shown in FIG. 1. A piston material 2 made of an aluminum alloy was vertically reciprocated while the piston ring 3 was rotated at 3.0 mm/s, and a load of 7 MPa as an unit pressure was applied at certain intervals. Thus, a simple cohesion test was performed for 3 hours. The temperature of the piston material 2 was controlled to 260° C. ±1° C. using a heater 1 and a thermocouple 5. A certain amount of lubricating oil was sprayed over the piston ring with nitrogen gas at predetermined intervals.

As the piston material, AC8A-T6 was used.

Figure 2A:
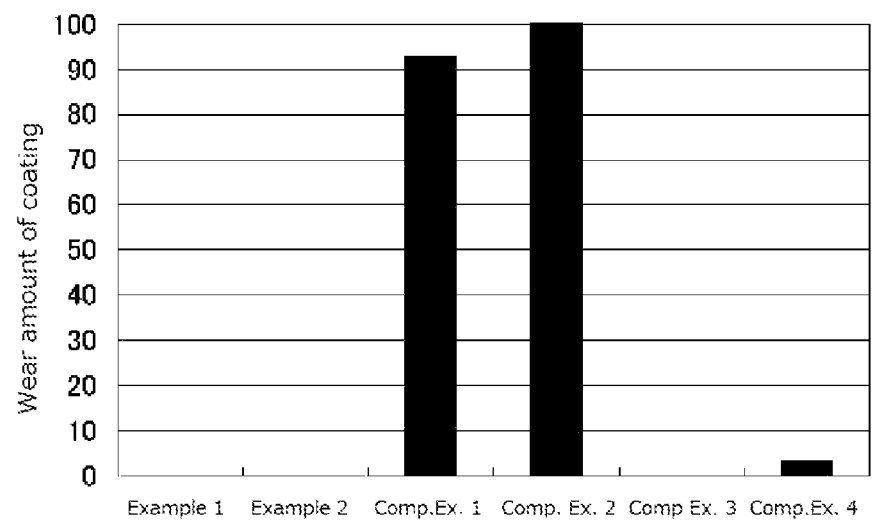
FIG. 2 is a diagram showing the wear amount of a coating (A) and the wear amount of a piston material (B) after a simple cohesion test.
Figure 2B:
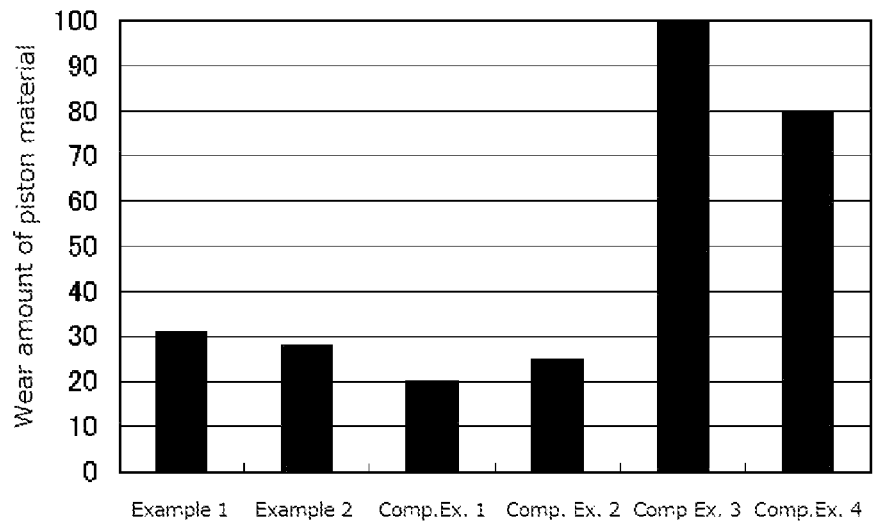

FIG. 2 shows results of evaluation of the wear amount of the coating of the piston ring and the wear amount of the piston material after the simple cohesion test. The wear amount of the coating of the piston ring is represented by a relative value when the wear amount of the coating in Comparative Example 2 is assumed to be 100. The wear amount of the piston material is represented by a relative value when the wear amount of the piston material in Comparative Example 3 is assumed to be 100.

In Comparative Example 1 using the coating obtained by dispersing molybdenum disulfide and graphite in polyamideimide, the polyamideimide coating was mostly lost and the underlying surface of the substrate was partially exposed after the simple cohesion test. Therefore, aluminum cohesion was confirmed. The surface of the piston material was not smoothened, and the progression of wear was confirmed. Like Comparative Example 1, the occurrence of aluminum cohesion was confirmed in Comparative Example 2 in which a copper powder was dispersed in polyamideimide.

In Comparative Example 3 using the amorphous hard carbon coating, the occurrence of aluminum cohesion was not confirmed, and the coating was not worn. However, the wear amount of the piston material is large. Even after the ring groove is smoothened, an opposite material may be worn in an engine. In Comparative Example 4 using the silica-based coating in which hard nanoparticles were not added, the coating was slightly worn. Therefore, the wear amount is smaller than that in Comparative Example 3, but the wear of the piston material is confirmed.

In contrast, in Example 1 in which hard nanoparticles were added to a silica-based coating, the wear of the coating was not confirmed like Comparative Example 3. The wear amount of the piston material was slightly larger than that in Comparative Examples 1 and 2 using the resin coating. However, a large decrease as compared with Comparative Examples 3 and 4 was confirmed. It is considered that this is because the Martens hardness is 4,850 N/mm² and was equal to or less than a half of the Martens hardness in Comparative Example 3 (11,000 N/mm²) and the friction coefficient was less than that in Comparative Example 4 due to dispersion of hard nanoparticles.

Example 2 had the same tendency as in Example 1. However, the wear amount of the piston material was much smaller than that in Example 1. It is considered that since the coating had small surface roughness and the attacking properties on the opposite material were reduced due to the hard nanoparticles used in Example 2 being more homogeneous than those in Example 1.

Example 3

Cluster Diamond (CD available from Tokyo Diamond Tools Mfg. Co., Ltd.), PTFE particles (KTL-500F available from Kitamura Limited., primary particle diameter: 0.2 to 0.3 μm), and a dispersant were added to a solution of 20% perhydropolysilazane in xylene (AQUAMICA available from AZ electronic Materials), and dispersed with an ultrasonic homogenizer. The dispersion state of cluster diamond and PTFE particles was confirmed by the particle size distribution. The amount of cluster diamond to be added was calculated using 1.6 g/cm³ as the density of silica, and was 3% by volume relative to the volume of the entire coating. The amount of PTFE particles to be added was 2% by mass (0.8% by volume) relative to the mass of the entire coating.

A piston ring made of oil tempered chromium silicon alloy steel wires for a valve spring (SWOSC-V) was subjected to alkaline degreasing, and then coated with the coating liquid by dip coating. The surface roughness Ra (JIS-'01) of a piston ring base material before coating was 0.11 μm. The coating was dried at 100° C. for 10 minutes, and then fired at 300° C. for 1 hour in an electric furnace. The thickness of the obtained coating was 2 μm, the Martens hardness HM of the matrix portion of the coating was 4,900 N/mm², and the surface roughness Ra (JIS-'01) of the coating was 0.23 μm. The Martens hardness HM of the matrix portion of the coating was calculated in the same manner as described above by pressing a triangular pyramid indenter against the matrix portion where the resin particles was not present using a microscope.

The obtained piston ring was attached to a simple cohesion test machine, and the cohesion test was performed in the same manner as in Example 1. FIG. 3 shows results of evaluation of the wear amount of the piston material after the simple cohesion test. The wear amount of the piston material is represented by a value relative when the wear amount of the piston material in Example 2 is assumed to be 100.

Examples 4 to 11

Each piston ring was produced in the same manner as in Example 3 except that the amount of PTFE particles to be added was changed into 1% by mass (Example 4), 8% by mass (Example 5), 10% by mass (Example 6), 12% by mass (Example 7), 14% by mass (Example 8), 16% by mass (Example 9), 18% by mass (Example 10), and 20% by mass (Example 11), relative to the mass of the entire coating. The obtained piston ring was attached to a simple cohesion test machine, and the simple cohesion test was performed in the same manner as in Example 3. FIG. 3 shows results of evaluation of the wear amount of the piston material after the simple cohesion test. The wear amount of the piston material is represented by a value relative when the wear amount of the piston material in Example 2 is assumed to be 100.

In Examples 3 to 11 in which PTFE particles were added, the wear amount of the piston material after the simple cohesion test was decreased by 30% or more as compared with Example 2 in which only cluster diamond was contained. It is considered that this is because the friction coefficient of the coating was decreased due to addition of PTFE particles and the occurrence and propagation of a crack were suppressed to maintain a good coating. In particular, when the contained amount of PTFE particles fell within a range of 8% by mass to 16% by mass relative to the amount of the entire coating, it was confirmed that the wear amount was less than that in Example 2 by 40% or more. When it fell within a range of 10 to 14% by mass, it was confirmed that the wear amount was equal to or less than 50% of that in Example 2.

In the piston rings of Examples 3 to 11 in which PTFE particles were added, the wear amount of the piston ring was equal to or less than that in Example 2. Even when PTFE particles are added, it can be seen that excellent wear resistance is maintained. Particularly, in Example 7, the maintenance of the coating over the whole area after the simple cohesion test was confirmed. In addition, the maintenance of excellent effect of preventing aluminum cohesion over a long period of time was confirmed.

REFERENCE SIGNS LIST

1 . . . Heater
2 . . . Piston material
3 . . . Piston ring
4 . . . Temperature controller
5 . . . thermocouple

The invention claimed is:

1. A piston ring comprising a coating covering at least one of upper, lower, and side faces thereof, with the coating being a silica-based coating containing nanodiamond particles, resin-based particles, and silica glass as a matrix,
   wherein the nanodiamond particles in an amount of 0.5% to 10% relative to a volume of the entire coating and the resin-based particles in an amount of 8% by mass to 16% by mass relative to a mass of the entire coating are dispersed in the silica glass matrix, and the nanodiamond particles have (i) an average primary particle size of up to 50 nm and (ii) an average secondary particle diameter of 50 to 200 nm, and
   wherein a portion of the coating where the resin particles are not present has a Martens hardness of 3,000 to 7,000 N/mm$^2$.

2. The piston ring according to claim 1, wherein the resin-based particles are at least one kind selected from the group consisting of fluorine-based resin particles and polyether-based resin particles.

3. The piston ring according to claim 1, wherein the coating has a thickness of 0.5 to 20 μm.

4. The piston ring according to claim 2, wherein the coating has a thickness of 0.5 to 20 μm.

* * * * *